May 26, 1970     H. G. OSTWALD     3,514,098

CARD TRANSPORTING APPARATUS

Filed Aug. 9, 1967     4 Sheets-Sheet 1

INVENTOR
Heinz Georg Ostwald
BY
Michael S. Striker
ATTORNEY

May 26, 1970  H. G. OSTWALD  3,514,098

CARD TRANSPORTING APPARATUS

Filed Aug. 9, 1967  4 Sheets-Sheet 4

INVENTOR
Heinz Georg Ostwald
BY
Michael S. Striker
ATTORNEY

United States Patent Office 3,514,098
Patented May 26, 1970

3,514,098
CARD TRANSPORTING APPARATUS
Heinz Georg Ostwald, Frankfurt am Main, Germany, assignor to Eichner Organisation Gesellschaft mit beschrankter Haftung Electronic und Buromaschinenfabrik, Frankfurt am Main, Germany
Filed Aug. 9, 1967, Ser. No. 659,476
Claims priority, application Germany, July 28, 1966,
E 32,168
Int. Cl. B65h *1/06*
U.S. Cl. 271—41                    11 Claims

ABSTRACT OF THE DISCLOSURE

The lowermost card of a stack is discharged through a slit in a container when an electromagnet is energized to turn a support member with a transporting roller and a motor rotating the transporting roller, to a position in which the roller is in contact with the lowermost card.

BACKGROUND OF THE INVENTION

The present invention relates to apparatus for separating and transporting single cards, sheets or the like of a stack by means of a driven transporting roller.

Apparatus of this type is known, and it is the object of the invention to provide an improved card transporting apparatus which reliably separates single cards from a stack, and is capable of operating at a very high speed. Another object of the invention is to provide apparatus which automatically operates to discharge single cards in succession.

SUMMARY OF THE INVENTION

With these objects in view, the present invention provides a motor-driven transporting roller which rotates in a position of rest, and is pressed against one outermost card of a stack in rotating condition so that the respective card is rapidly discharged. The transporting roller is moved in a direction transverse to the plane of the card to the transporting position, but in a modified arrangement, the roller is also moved in the discharge direction of the card whereby the transporting speed is increased.

One embodiment of the invention comprises transporting roller means mounted for movement between a position of rest and a transporting position in contact with the outermost, preferably lowermost, card of a stack, drive means preferably a motor rotating the transporting roller means for discharging a card in the transporting position, and operating means preferably an electromagnet, for moving the transporting roller means between the position of rest and the transporting position.

The stack is disposed in a supporting housing provided with a card knife which forms a slit for the discharge of the lowermost card. The motor rotates the transporting roller means in the position of rest and in the transporting position, so that the roller means rotates at full speed when engaging the card.

Preferably, the electromagnet and the transporting roller means driven by the same are mounted on a member which is turnable about a pivot axis, and is connected by a lever to the electromagnet which upturns the motor with the transporting roller means to and from the transporting position.

It is advantageous to move the roller also in the discharge direction so that the discharge speed of the card is increased. The operating lever is preferably provided with a roller which rolls on a surface of the member which supports the motor and transporting roller means, or on the housing of the motor, while the electromagnet moves the same to the transporting position, while the return to the position of rest is advantageously accomplished by a spring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
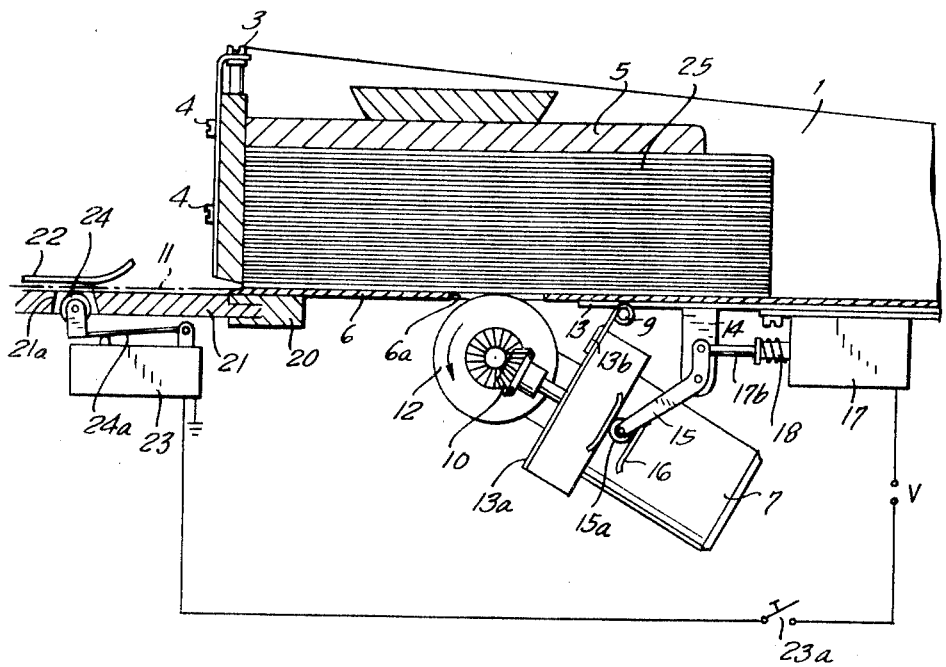
FIG. 2 is a vertical sectional view illustrating the transporting position of the apparatus.
Figure 3:
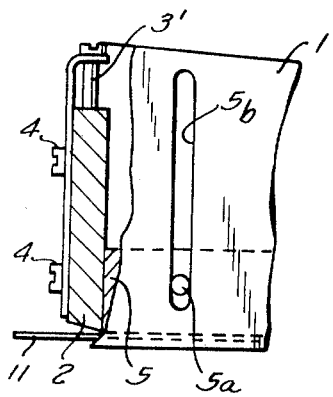
FIG. 3 is a fragmentary side view of a portion of the apparatus shown in FIG. 1.
Figure 4:
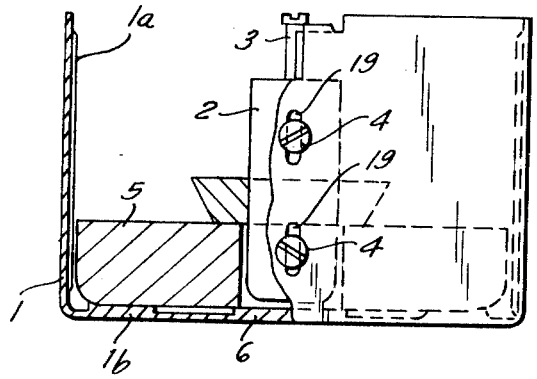
FIG. 4 is a fragmentary front view, partially in cross-section, of the apparatus shown in FIG. 1.
Figure 5:
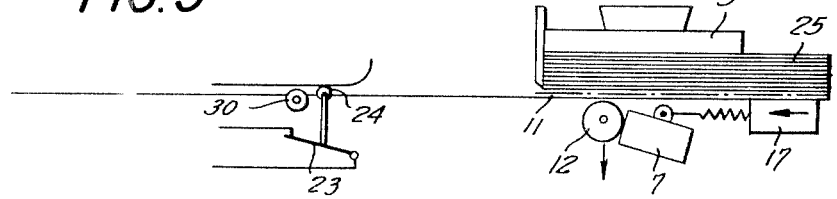
FIGS. 5 to 9 are fragmentary schematic side views illustrating successive operational conditions of the apparatus.

The embodiment illustrated in FIGS. 1 to 4 has supporting means for a stack of cards, paper sheets, and the like, which comprise a box-shaped housing 1 closed in front by a card knife 2 forming a horizontal discharge slit 2*a* with the bottom plate 6 which has an opening 6*a* in the region of a transporting roller 12. Card knife 2 can be raised and lowered, with screws 4 moving in slots 19, as best seen in FIG. 4, so that after adjustment of the height of slit 2*a* to the thickness of the cards, the card knife 2 is fixed by screws 4.

The stack of cards 25 is loaded by a pressure member 5 which is shown in its lowermost position in FIG. 4, resting on abutments 1*b* of the bottom plate 6. During its downward movement, the sides of pressure member 5 slide on vertical ribs 1*a* of the side walls of the housing 1. Pressure member 5 has laterally projecting guide studs 5*a* guided in vertical slots 5*b* of housing 1, as best seen in FIG. 3.

A transporting roller 12 to which a bevel gear 10*a* is secured, is mounted for rotation on a shaft 12*a* carried by bracket means 12*b* secured to a member 13*a* which is mounted for pivotal movement about a journal pin 9 carried by a mounting plate 13 secured to bottom plate 6. A spring 13*b* is secured to plate member 13*a* and to mounting plate 13 and resists turning of plate member 13*a* about journal pin 9 in clockwise direction.

An electromotor 7 has a housing with a member 7*a* secured to plate member 13*a*. The shaft of motor 7 carries a bevel gear 10 meshing with bevel gear 10*a* so that during rotation of motor 7, transporting roller 12 is rotated in counterclockwise direction as indicated by the arrow.

Figure 1:
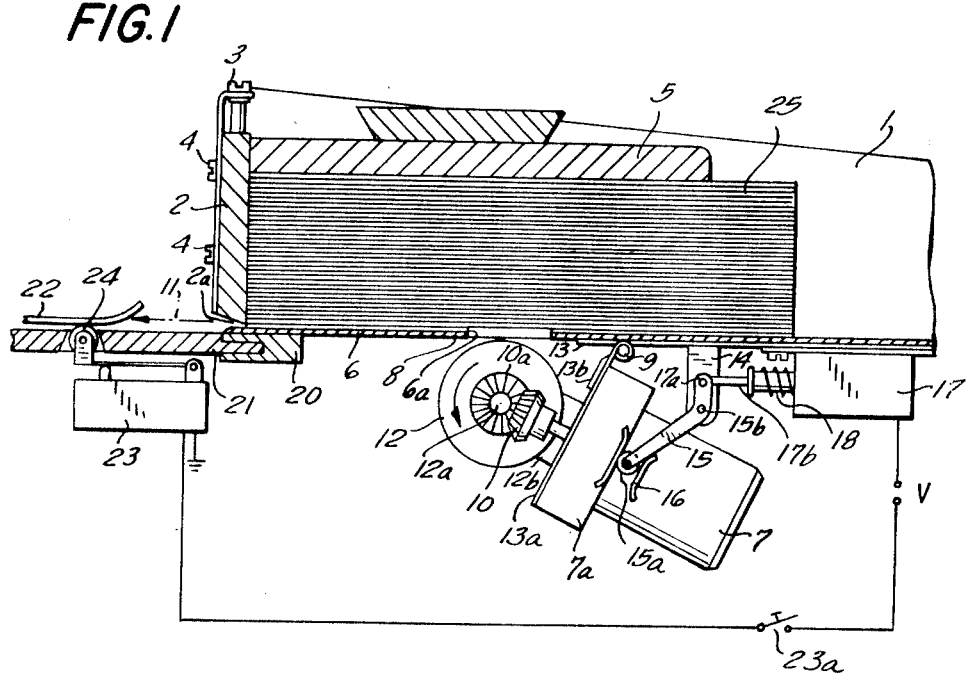
FIG. 1 is a vertical sectional view illustrating one embodiment of the invention in a first position.

A guideway 16 is secured to member 7*a* and guides roller 15*a* of an angular lever 15 which is mounted for turning movement about a pivot pin 15*b* carried by a bracket 14 of mounting plate 13. A pin at the end of the short arm of the lever 15 connects the same with the armature rod 17*b* of an electromagnet 17 whose armature is loaded by spring 18 to move to the left as viewed in FIG. 1 when electromagnet 17 is not energized, as shown in FIG. 1. In this position of rest, the peripheral surface of roller 12 is located below the lowermost card 11 of the stack, and preferably below bottom plate 6.

When electromagnet 17 is energized and attracts its armature rod 17b while compressing spring 18, lever 15 is turned in clockwise direction to the position of FIG. 2 so that the pressure of roller 15a on guideway 16 turns motor 7 with plate member 13a and transporting roller 12 in clockwise direction against the action of spring 13b so that a portion of transporting roller 12 is located in opening 6a of the bottom plate engaging the lowermost card of the stack. Since roller 12 already rapidly rotated at full speed when engaging the lowermost card 11, the same is rapidly discharged through slot 2a along a guide plate 21 and into a channel formed between guide plate 21 and another guide plate 22.

Guide plate 21 has a cut-out 22 in which a roller 24 of the actuator arm 24a of a switch 23 is located. The switch is spring-loaded so that actuator arm 24 normally assumes the position shown in FIG. 1 in which roller 24 slightly projects above the top surface of guide plate 21. However, when a card 11 is discharged, roller 24 and actuator arm 24a are pressed down to the position of FIG. 2 so that switch 23 is operated.

Control switch 23 is connected into a circuit including a manually operated switch 23a, and a voltage source connected to electromagnetic means 17 so that the same is de-energized when control switch 23 opens. Roller 24 and transporting roller 12 are spaced a predetermined distance which depends on the length of the cards, and is not accurately shown in FIG. 2 for the sake of simplicity.

Referring now to FIGS. 5 to 9, FIG. 5 shows the apparatus in an inoperative condition. Electromagnetic means 17 is not energized, transporting roller 12 is below the bottom plate of the card magazine, and motor 7 is de-energized. Control switch 23 is in its normal closed position.

Figure 6:
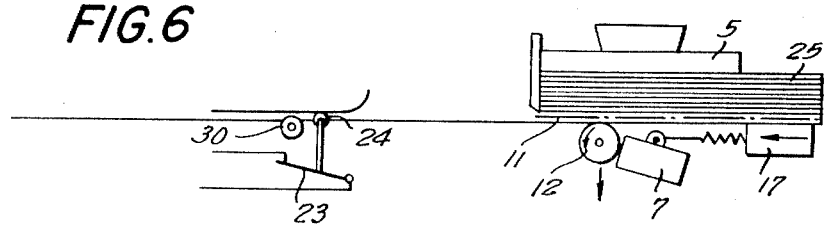
Figure 7:
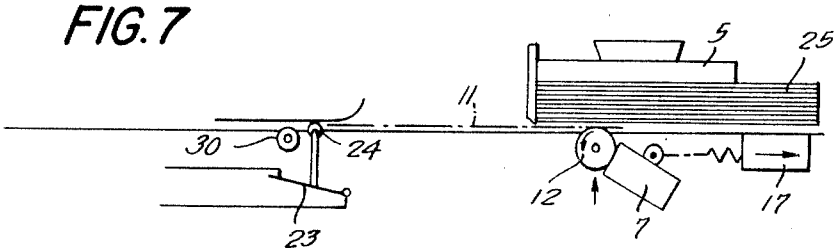
Figure 8:
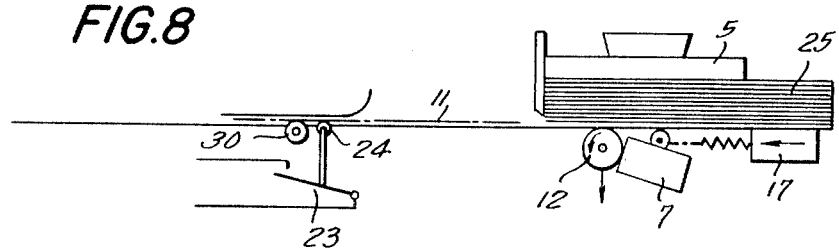

In the position of FIG. 6, motor 7 is energized and transporting roller 12 rotates in its normal position of rest since electromagnetic means 17 is disconnected from the voltage source by the open switch 23a, as also shown in FIG. 1. In the positions of FIGS. 2 and 7, switch 23a has been closed so that electromagnetic means 17 is energized and operates lever 15 to turn the transporting means 7, 13a, 12 to the transporting position in which roller 12 is partly located in opening 6a of bottom plate 6 and engages the lowermost card while rotating in the direction of the arrow. Since roller 12 rotates at full speed when engaging card 11, the same is rapidly transported through slit 2a into the channel between guide members 21 and 22.

The distance between roller 24 and transporting roller 12 corresponds to the length of a card so that the trailing end of the transported card is released by transporting roller 12 at the moment in which its leading end depresses roller 24 and opens control switch 23. Other transporting means 30 of a conventional nature transport the discharged cards 11 further to the position of FIG. 8, while electromagnetic means 17 remains disconnected from the voltage source V by the open control switch 23.

Spring 18 returns lever 9 to its initial position, and spring 13b turns support plate 13a in counterclockwise direction so that transporting roller 12 moves away from the next following lowermost card of the stack so that the same is not transported directly when the trailing end of the discharged card 11 has passed beyond transporting roller 12.

Figure 9:
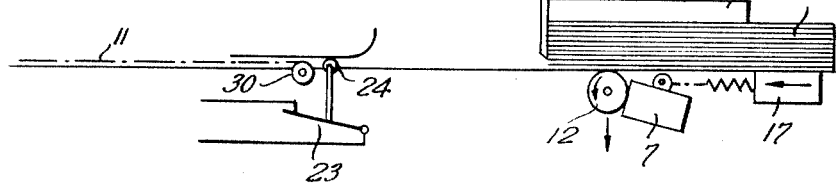

When the trailing end of the card transported by the auxiliary transporting means 30 has released roller 24 of control switch 23 in the position of FIG. 9, control switch 23 closes again, and if manually operated switch 23a remains closed, electromagnetic means 17 is automatically energized, and transporting roller 12 is raised to its transporting position for transporting the next lowermost card. The auxiliary transporting means 30 is schematically shown as a pair of transporting rollers, but may be transporting sprockets of a punching device or read-out device for the cards. It is also possible to connect the terminals of control switch 23 by a manually operated switch, not shown, and to control the card discharging operations only by switch 23a. The above-described automatic card discharging operation is repeated until all cards of the stack have been doscharged.

In the embodiment of FIGS. 1 to 4, transporting roller 12 turning about journal pin 9 moves along a path transverse to the direction of the horizontal path of movement of the lowermost card 11 which is determined by the horizontal bottom plate 6.

Figure 10:
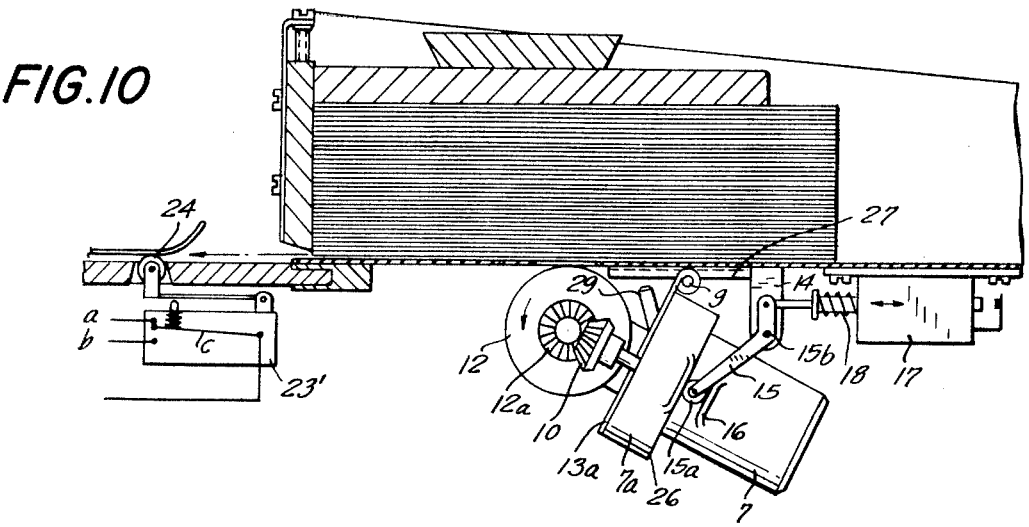
FIG. 10 is a vertical sectional view illustrating a modified embodiment of the apparatus in a first operational condition.
Figure 11:
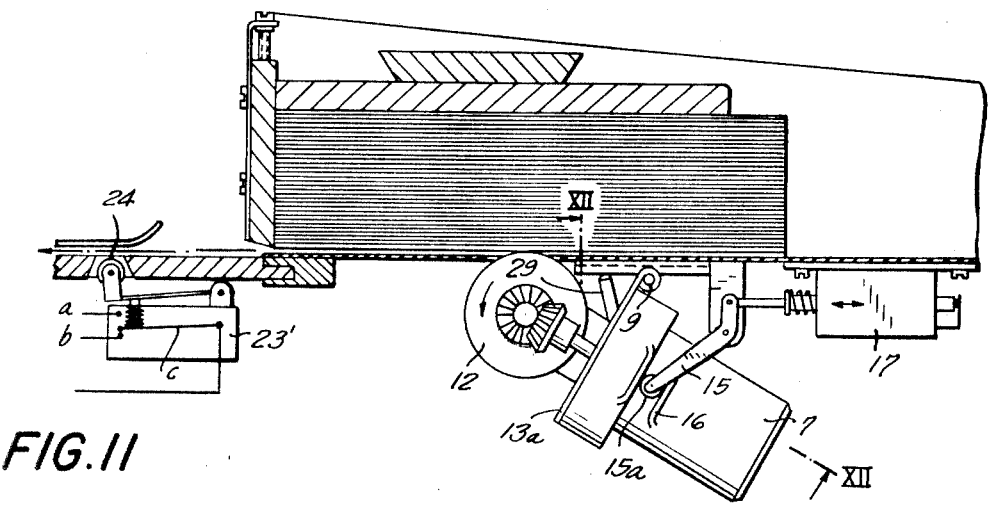
FIG. 11 is a vertical sectional view illustrating the embodiment of FIG. 10 in the card transporting position.
Figure 12:
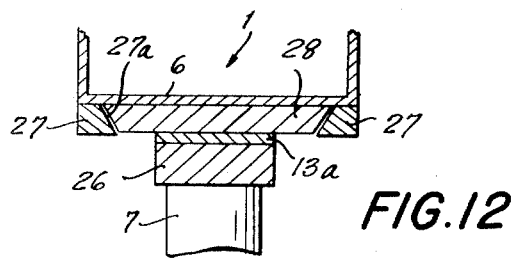
FIG. 12 is a fragmentary sectional view taken on line XII—XII in FIG. 11.

In the modified embodiment of the invention illustrated in FIGS. 10 to 12, plate member 13a on which transporting roller 12 and motor 7 are supported, is pivotally mounted on a journal pin 9 which is supported by a slide 28 guided in the guideway 27a of a member 27 which is secured to bottom plate 6. Plate member 13a has a projection 29 which abuts slide 28 in the transporting position of transporting roller 12 shown in FIG. 11.

The operation of the modified embodiment of FIGS. 10 to 12 is the same as that described with reference to FIGS. 1 to 9, with the exception that upon energization of electromagnetic means 17 and turning of lever 15, the force transmitted to the guideway 16 to member 7a not only turns plate member 13a with roller 12 and motor 7 to the transporting position engaging the lowermost card, but also pushes slide 28 in the discharge direction of card 11 so that the peripheral speed of transporting roller 12 and the speed in the discharge direction are added to result in a very high discharge speed. When electromagnetic means 17 is de-energized by control switch 23' operated by the discharged card, spring 18 turns lever 15 so that roller 15a acting on guideway 16 pulls plate member 13a with journal pin 9 and slide 28 back toward the right as viewed in FIGS. 10 and 11. However, it is preferred to provide two stationary contacts a and b in control switch 23' cooperating with a contact c operated by roller 24. Contacts a and c perform the function described for control switch 23 with reference to FIGS. 5 to 9, while contact b is connected into the circuit of electromagnetic means 17 to reverse the same so that the withdrawal of slide 28 with transporting roller 12 and motor 7 is effected by the force of the electromagnetic means 17.

It will be understood that each of the elements described above, or two or more together, may also find a useful application in other types of card transporting apparatus differing from the types described above.

While the invention has been illustrated and described as embodied in an apparatus for transporting single cards by a tranasporting roller which is automatically moved between a position of rest and a transporting position engaging the lowermost card of a stack, it is not intended to be limited to the details shown, since various modifications and structural changes may be made without departing in any way from the spirit of the present invention.

What is claimed as new and desired to be protected by Letters Patent is set forth in the appended claims.

1. Card transporting apparatus comprising, in combination, supporting means for supporting a stack of cards and having a slit for the discharge of one outermost card of the stack in one direction; transporting roller means; means mounting said transporting roller means for movement a position of rest and a transporting position in contact with said outermost card; an electromotor mounted on said mounting means for movement with said transporting roller means between said positions, and rotating said transporting roller means in one direction for discharging said outermost card in said transporting position of said transporting roller means; and operating means for moving said transporting roller means and said electromotor between said position of rest and said transporting position.

2. Apparatus as claimed in claim 1, wherein said electromotor rotates said transporting roller means in said position of rest and in said transporting position to that said roller means rotates at full speed when engaging said outermost card in said operative position.

3. Apparatus as claimed in claim 1, wherein said supporting means and said slit form a path for said outermost card; wherein said mounting means support said transporting roller means and electromotor for angular movement between said positions in a direction transverse to said path.

4. Apparatus as claimed in claim 1, wherein said supporting means and said slit form a path for said outermost card; wherein said mounting means support said transporting roller means for angular movement between said positions in a direction transverse to said path, and also in a direction substantially parallel to said path so that said operating means move said transporting roller means also in said parallel direction.

5. Apparatus as claimed in claim 1, wherein said operating means include an electromagnetic means connected with said transporting roller means for moving the same to said transporting position, and means urging the same to said position of rest.

6. Apparatus as claimed in claim 1, wherein said supporting means has a bottom plate slidably supporting the outermost card of said stack which is the lowermost; wherein said slit is located adjacent said bottom plate at the level of the lowermost card, and wherein said bottom plate has an opening covered by the lowermost card and located in the path of movement of said transporting roller means to and from said transporting position so that a portion of said transporting roller means is located in said opening in said transporting position abutting said lowermost card.

7. Apparatus as claimed in claim 1, wherein said mounting means includes a member mounted for pivotal movement on said supporting means and supporting said motor and said transporting roller means for movement between said position of rest and said transporting position, and means biasing said member and roller means into said position of rest; wherein said operating means include an electromagnet mounted on said supporting means and having an armature, a lever means mounted on said supporting means for pivotal movement and having one end connected to said armature and the other end operatively connected with said member for turning the same with said transporting roller means and said motor to said transporting position against the action of said biasing means when said electromagnet is energized; and comprising means for intermittently energizing said electromagnetic means and for continuously energizing said motor so that said transporting roller means rotates before arriving in said transporting position.

8. Apparatus as claimed in claim 7, wherein said supporting means includes a guide way extending in said one direction; wherein said mounting means include a slide guided in said guide way and supporting said member for pivotal movement, said member having a guide way for guiding said other end of said lever so that the energized electromagnet means moves said member with said slide and said roller means in said one direction when turning the same into contact with said outermost card whereby the same is transported in said one direction.

9. Apparatus as claimed in claim 7, wherein said lever means has a roller on said other end in rolling contact with a surface of said member.

10. Apparatus as claimed in claim 5, including a control switch means engaged and operated by a card discharged through said slit and spaced such a distance from said transporting roller means that the leading end of the discharged card operates said control switch when the trailing end of the same has passed said transporting roller means, said control switch being connected into the circuit of said electromagnetic means and causing deenergization of the same when operated by the discharged card so that said transporting roller means is moved to said position of rest.

11. Apparatus as claimed in claim 10, comprising means for transporting said discharged card when the leading end of the same has passed said control switch and being located forwardly of the same so that said discharged card is transported until the trailing end thereof passes said control switch so that the same closes and energizes said electromagnetic means whereby said transporting roller means is moved by the same to said transporting position for discharging the next outermost card.

References Cited

UNITED STATES PATENTS 1,441,271   1/1923   Escobales _____ 271—41

OTHER REFERENCES

IBM Technical Disclosure Bulletin, vol. 8, No. 1, June 1965.

EDWARD A. SROKA, Primary Examiner